June 5, 1934.  F. MARASSO  1,961,698
DOUGH DIVIDER
Filed Oct. 29, 1932  5 Sheets-Sheet 1

Inventor:
Fred Marasso,
by his Atty.

June 5, 1934.   F. MARASSO   1,961,698
DOUGH DIVIDER
Filed Oct. 29, 1932   5 Sheets-Sheet 2

June 5, 1934.  F. MARASSO  1,961,698
DOUGH DIVIDER
Filed Oct. 29, 1932   5 Sheets-Sheet 3

Inventor:
Fred Marasso,
by Charles C. Shurvey
his Atty.

June 5, 1934.  F. MARASSO  1,961,698
DOUGH DIVIDER
Filed Oct. 29, 1932   5 Sheets-Sheet 4
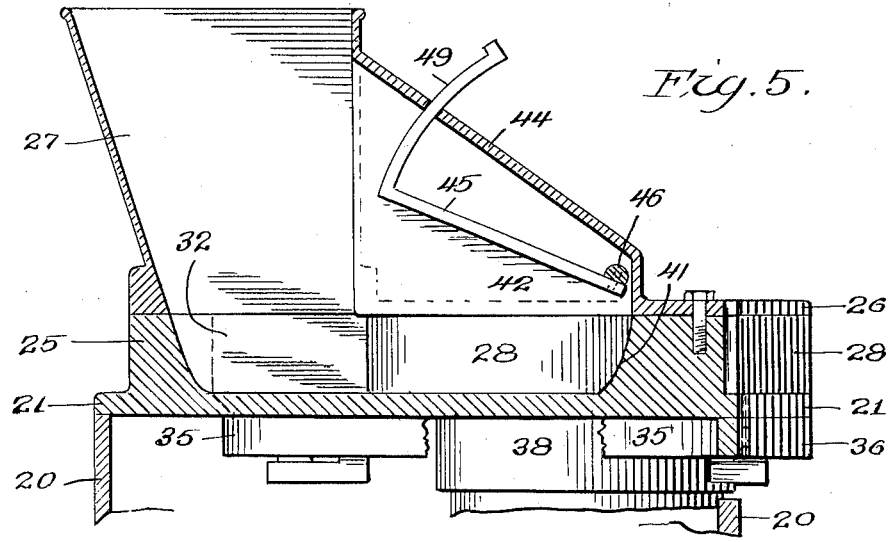
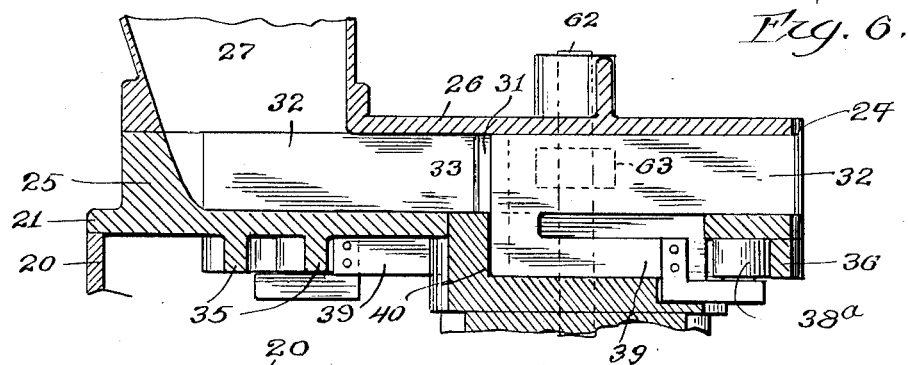
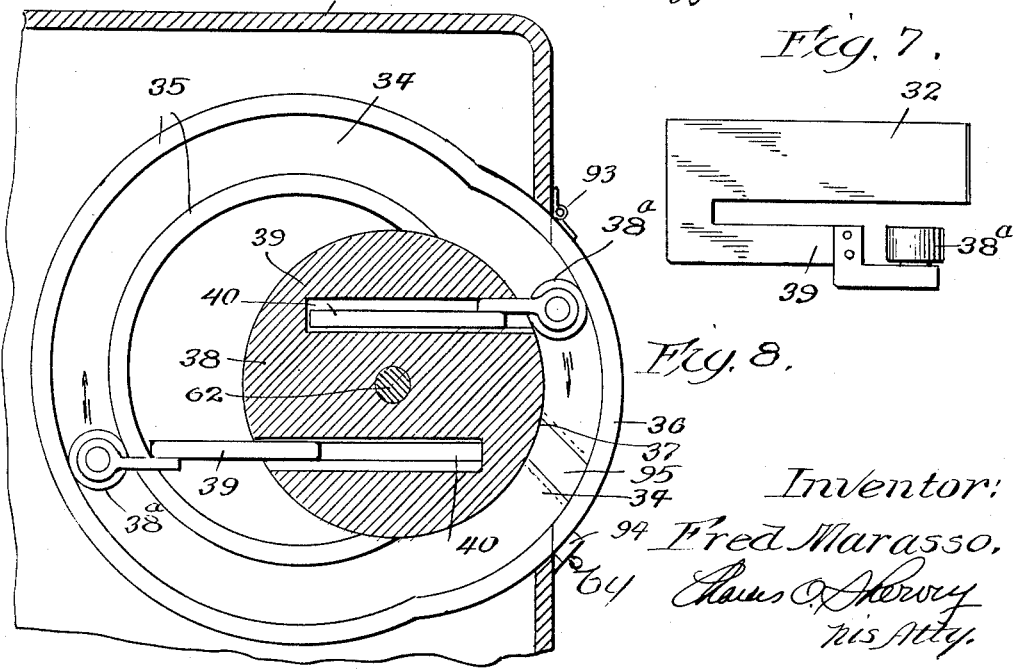
Inventor:
Fred Marasso,
his Atty.

June 5, 1934.  F. MARASSO  1,961,698
DOUGH DIVIDER
Filed Oct. 29, 1932   5 Sheets-Sheet 5
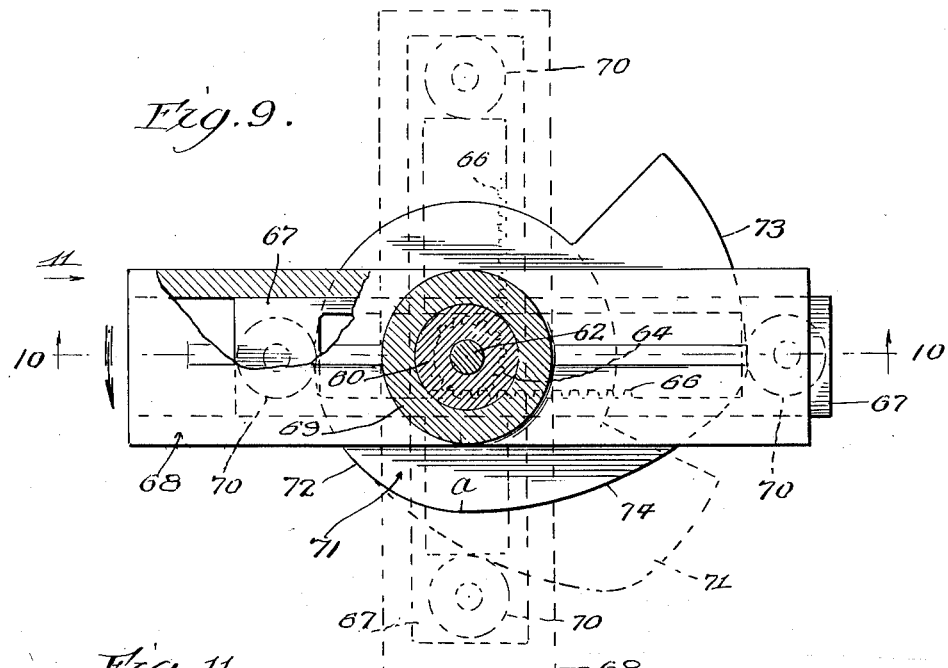
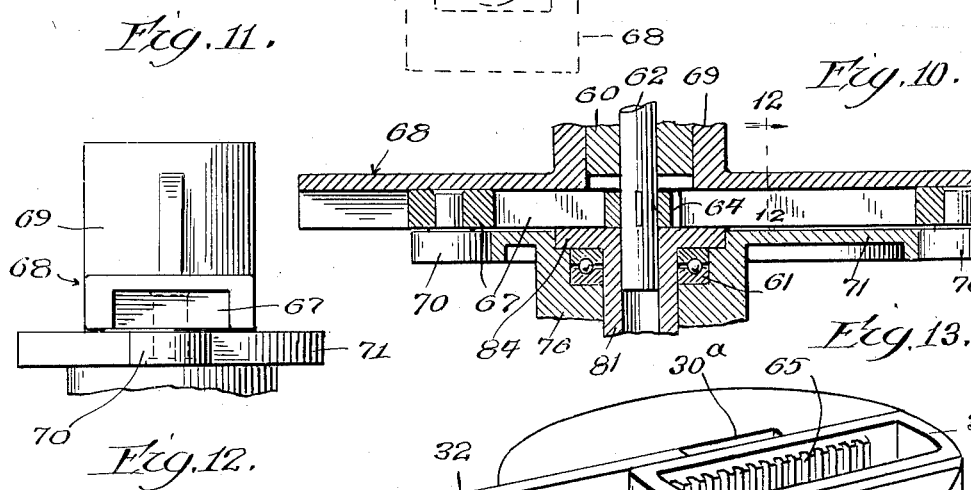
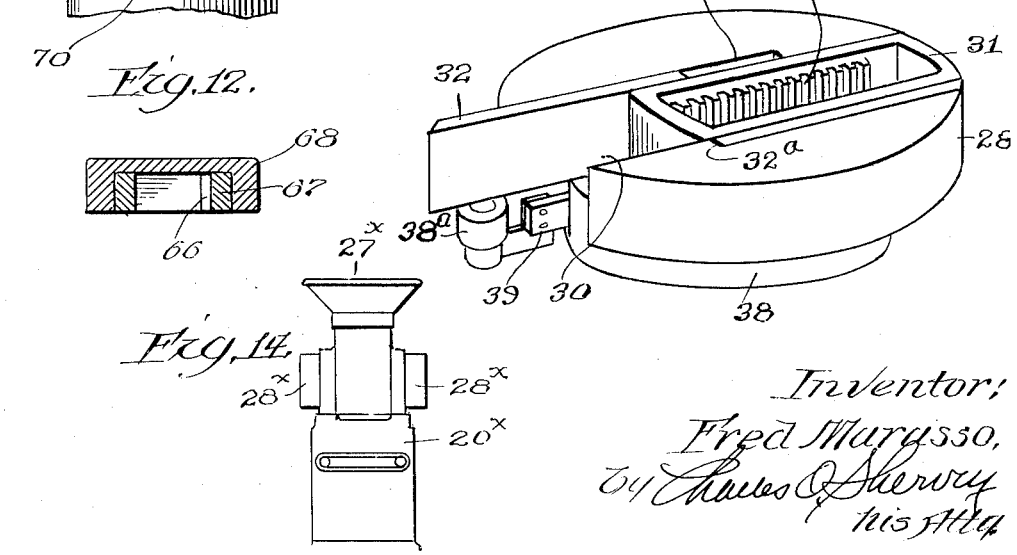

Patented June 5, 1934

1,961,698

UNITED STATES PATENT OFFICE 1,961,698

DOUGH DIVIDER

Fred Marasso, Joliet, Ill., assignor to Union Machinery Company, Joliet, Ill., a corporation of Illinois Application October 29, 1932, Serial No. 640,256

20 Claims. (Cl. 107—15)

This invention relates to dough dividers, and among its objects are to obtain accuracy, increased capacity, proper pressure on the dough, together with adjustment of the pressure to suit the requirements, adjustability to vary the size and weight of the lumps of dough, simplicity, stability and a high degree of efficiency.

Considerable difficulty has been heretofore encountered in dough dividers, because of the tendency of the mechanism to "kill" the dough and one object of this invention is to minimize this tendency. Difficulty has been found in scaling the lumps of dough accurately, and the present invention aims to overcome this difficulty. The invention consists in a dough divider having a rotating head, provided with one or more pockets therein in which the dough is measured or scaled and having blades traveling with the head and acting to fill the pockets with dough. The invention further consists in the provision of a rotating head in which is contained a plunger in each pocket for controlling the size and weight of the lumps of dough and for ejecting them from the pockets. The invention further consists in the provision of an escape passage for any excess amount of dough which is swept to the pockets and associated pressure means for exerting pressure against the escaping dough whereby to obtain accuracy in the size and weight of the lumps of dough. The invention further consists in the provision of means carried by the rotating head for filling the pockets with dough under pressure, and other means for controlling the size and weight of the lumps of dough. The invention further consists in the several novel features of construction, arrangement and combination of parts hereinafter fully set forth and claimed.

The invention is clearly illustrated in the drawings accompanying this specification in which:

Fig. 5 is a detail vertical section taken on the line 5—5 of Fig. 3;

Fig. 6 is a detail vertical section taken on the line 6—6 of Fig. 3;

Fig. 7 is a detail side elevation of one of the blades which co-operates with the head to fill an associated pocket;

Fig. 8 is a detail horizontal section taken on the line 8—8 of Fig. 1;

Fig. 9 is a view of the plunger actuating means partly in plan and partly in horizontal section taken on the line 9—9 of Fig. 1;

Fig. 10 is a detail vertical section taken on line 10—10 of Fig. 9;

Fig. 11 is a detail end view of the mechanism seen in Fig. 9 looking in the direction of the arrow 11;

Fig. 12 is a detail vertical cross section taken on the line 12—12 in Fig. 10;

Fig. 13 is a perspective view of the rotating head and blades and

Fig. 14 is an end elevation illustrating a modification of the invention.

Figure 4:
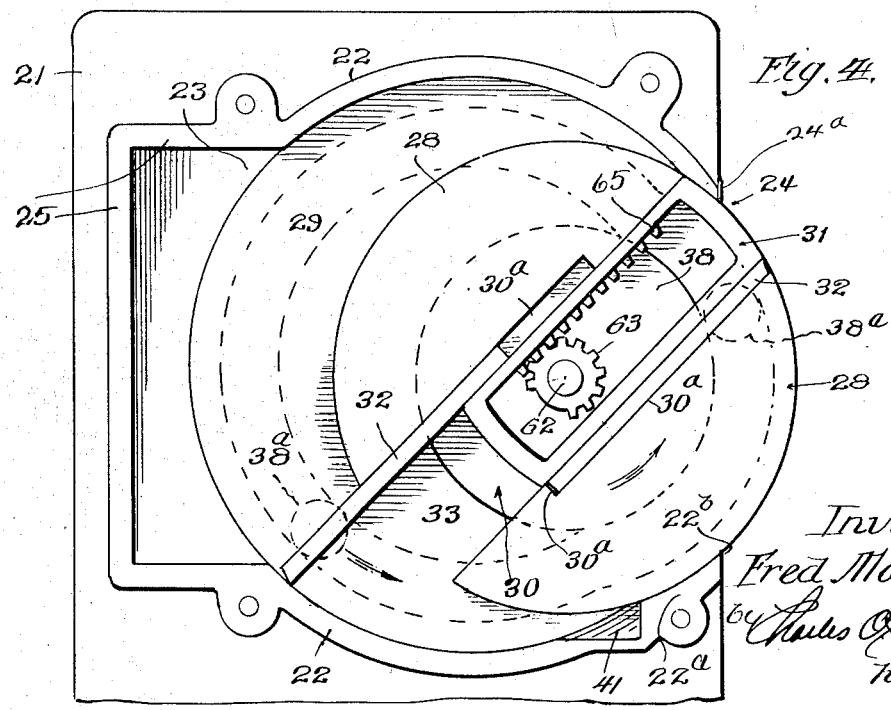
Fig. 4 is a plan of the base plate and rotating head with the top plate removed.

Referring to said drawings, the reference character 20 designates the base of the dough divider which may be in the form of a rectangular hollow structure for containing the driving mechanism, and upon the upper end of the base is secured a bed plate 21 above which is the dividing mechanism. Extending up from the bed plate are cylindrical or arcuate walls 22 (see Fig. 4) between the ends of which is an inlet opening 23 and a discharge opening 24. At the inlet opening the walls 22 are connected by walls 25 that provide a space through which the dough enters the chamber in which the dough is divided. Bolted or otherwise secured to the walls 22, 25 is a cover plate 26 which is provided with a rectangular opening at one side, around which is a hopper 27 that extends upward from the walls 25 and receives the dough which is to be divided. The bed plate, cylindrical walls 22 and top plate 26 provide a housing containing a chamber into which the dough is admitted from the hopper 27.

Located immediately above the bed plate and rotatively mounted on the base of the machine is a cylindrical rotating head 28 which is contained within the chamber in the housing, and is eccentrically disposed with respect to the cylindrical walls thereof. Between the walls 22, 25 of the housing and the head 28 is a space 29 which is herein termed a receiving chamber, wherein the dough discharges from the hopper. The head 28 projects through the opening 24 of the housing, and the lumps of dough are discharged from the head through this opening.

In the form of the invention illustrated, the head 28 is formed with a radially extending opening or slot 30 which opens out at both ends through the cylindrical face of the head, and mounted to reciprocate in said opening is a plunger 31 which forms movable ends for the pockets and acts to control the size of the lumps of dough and to eject them from the head. Between the sides of the plunger 31 and the sides of the opening 30, the head is formed with guide ways 30a in which are blades 32 which are capable of being projected beyond the cylindrical face of the head whereby they may traverse the receiving chamber with their extreme ends engaging the inner faces of the cylindrical walls 22 and thereby sweep the dough into the pockets. The spaces between the blades 32 and opposite walls of the openings 30, and between the bed plate and cover plate provide the pockets 33, the capacity of which is controlled by the plunger 31, and during the operation of the machine, the plunger reciprocates through the opening 30, thereby uncovering the pocket at one end for the admission of dough and ejecting the lump of dough from the pocket at the opposite end. A scraper 24a on the wall 22 at the end of the discharge opening 24 serves to scrape the dough from the plunger in case it adheres thereto. The plunger is reciprocated by motion transmitting mechanism which will be presently explained.

The means illustrated for projecting the blades 32 so that they will traverse the crescent shaped receiving chamber 29, comprises a track 34 (see Fig. 8) composed in part or parallel ribs 35 that project down from the bed plate 21, and a rib 36 and the cylindrical face 37 of a hub 38 which is provided on the underside of the head 28, and projects down through a hole in the bed plate. The greater portion of the track formed by the ribs 35 is concentric with the walls 22 of the receiving chamber and the remainder of the track is concentric with the measuring head. Traveling in this track are rollers 38a which are carried by arms 39 that extend down from the blades 32 (see Fig. 7) and reciprocate in slots 40 formed in the hub 38. With this arrangement of track the outer ends of the blades are kept in contact with the inner faces of the cylindrical walls 22 while passing through the receiving chamber and are kept flush with the cylindrical face of the head when fully retracted. By reference to Fig. 4 it will be understood that as a blade passes through the crescent shaped receiving chamber, it encounters the dough which has entered the same and sweeps it into the open pocket 33, thereby completely filling it, and as the blade approaches the constricted part of the receiving chamber the excess amount of dough contained in said constricted part is extruded, as will be presently explained, thereby leaving the exact amount in the pocket.

Figure 1:
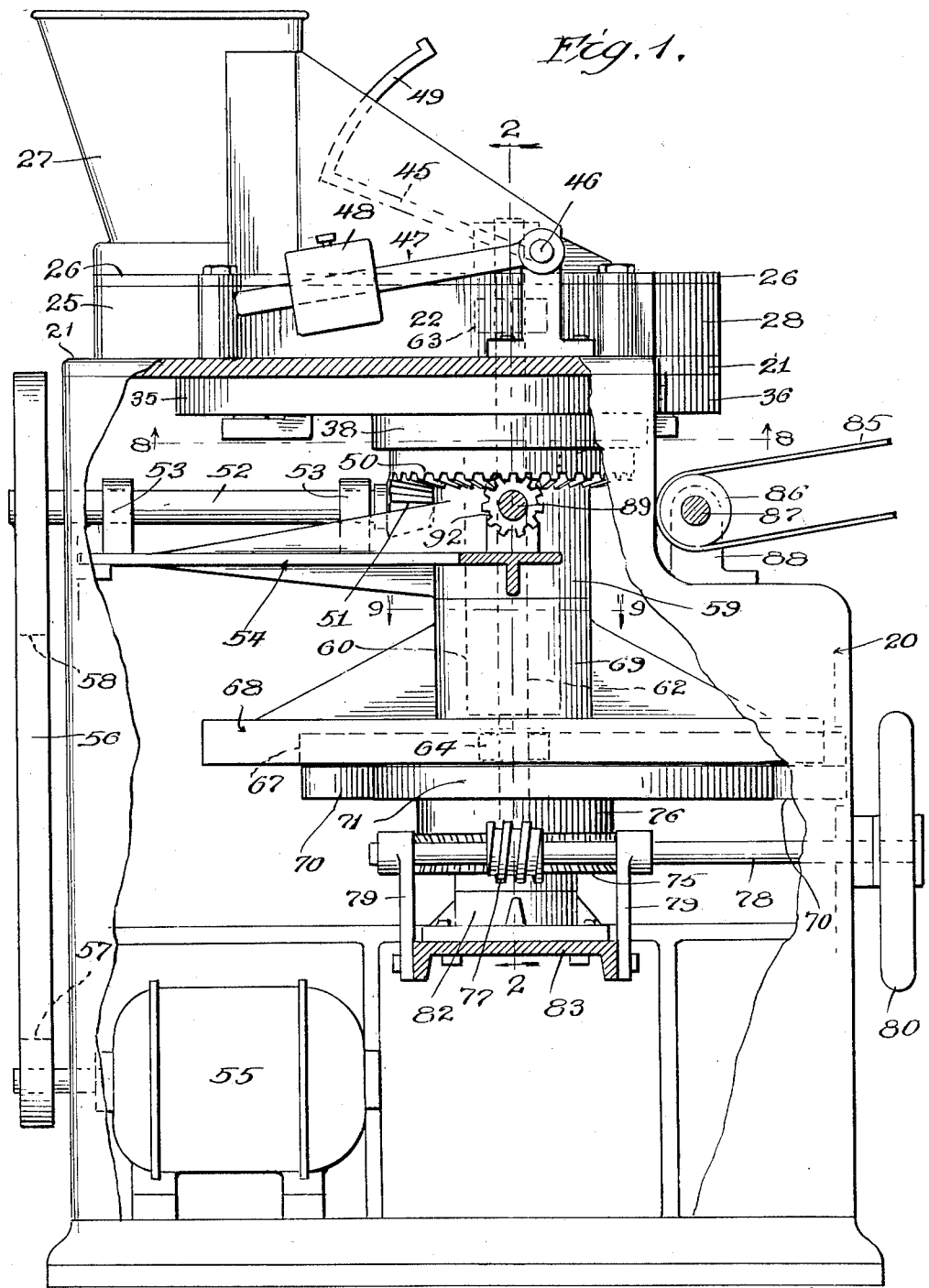
Fig. 1 is a view partly in side elevation and partly in vertical section illustrating a dough divider embodying a simple form of the present invention.
Figure 2:
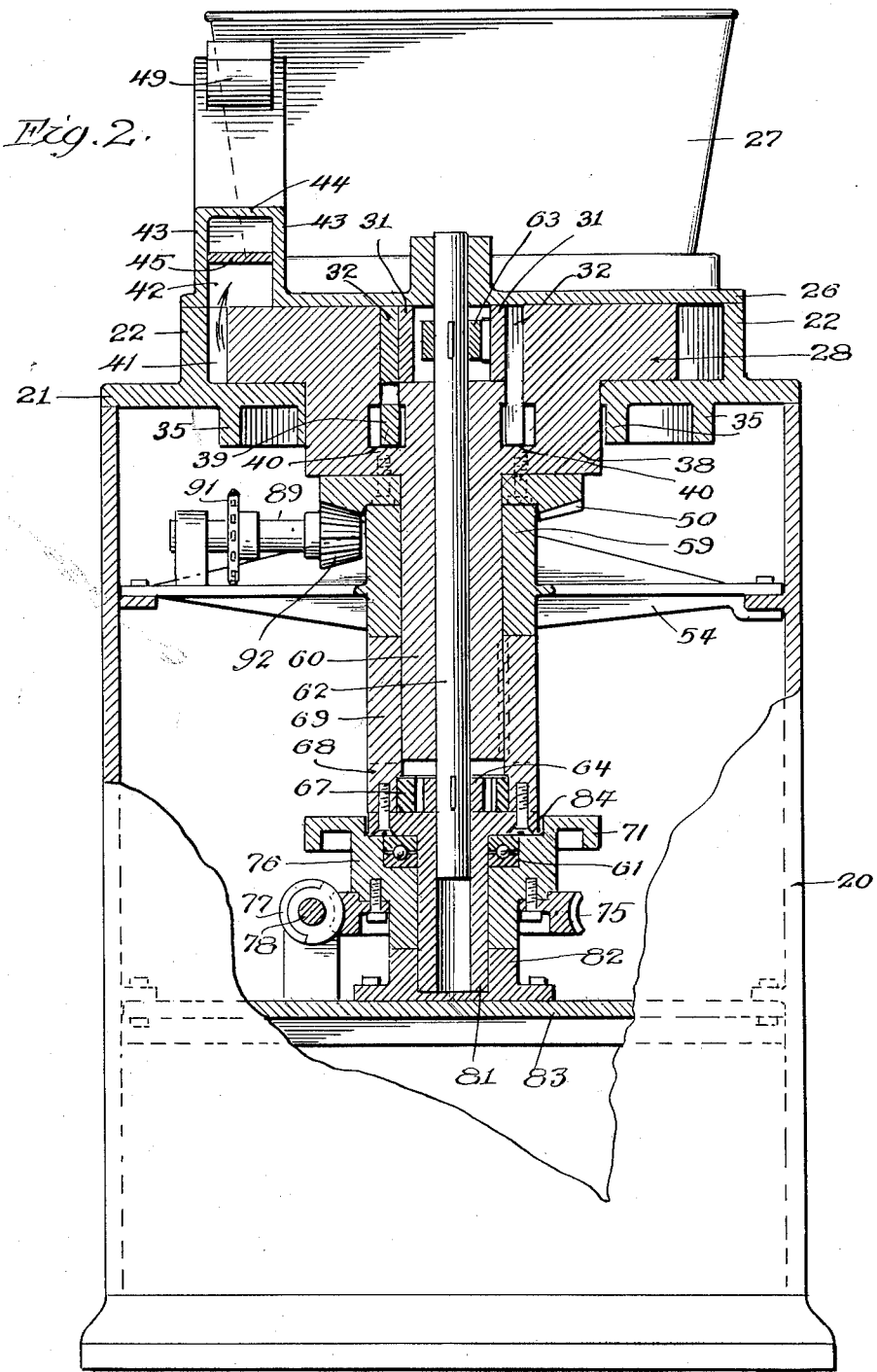
Fig. 2 is a view partly in end elevation and partly in vertical cross section taken on the line 2—2 of Fig. 1.
Figure 3:
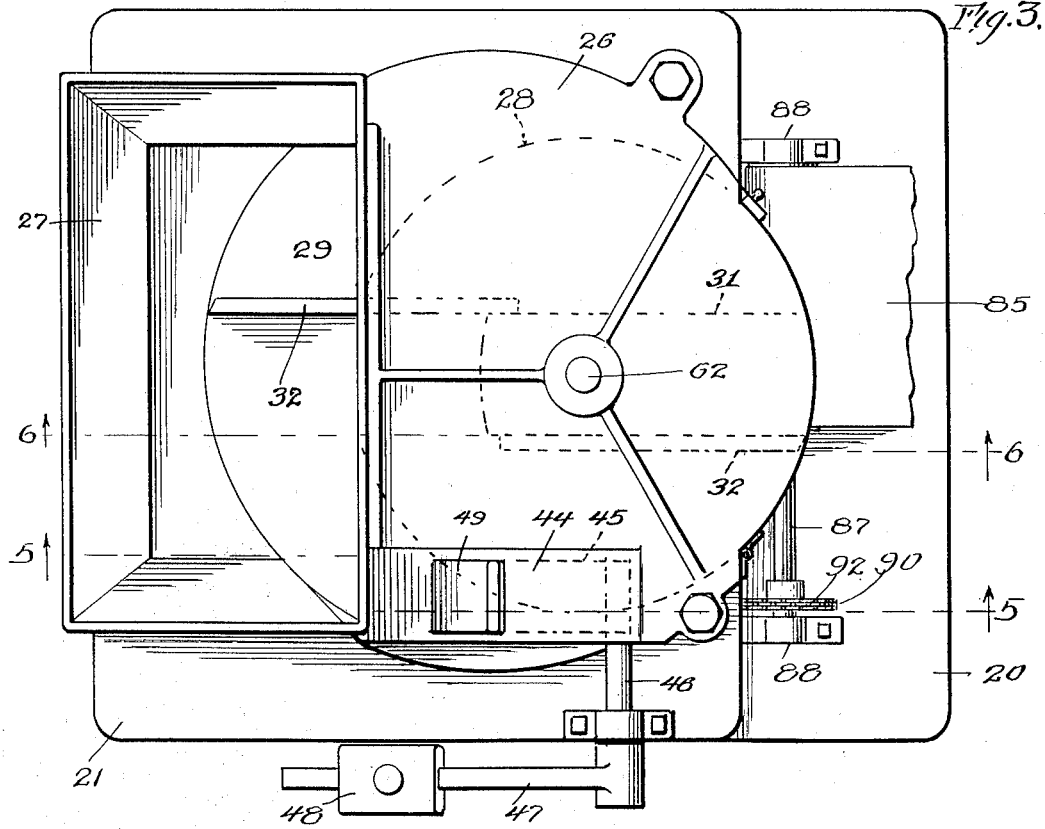
Fig. 3 is a plan of the machine.

Leading upward from the end of said constricted part of the receiving chamber is an escape passage 41 (see Figs. 2 and 5) which leads upwards through an escape passage 42 (see Fig. 5) contained between walls 43, 44 that are formed upon the cover plate. The escape passage 42 leads to the hopper 27 and permits any extruded material to be returned to the receiving chamber and hopper.

Pressure is applied to the extruded material in the escape passage 42, and said pressure is applied with a pressure plate 45 carried by a shaft 46 which extends out through a wall 43 and carries a weighted arm 47 on its outer end. A weight 48 adjustably mounted on the arm 47 provides means for regulating the amount of pressure which the pressure plate applies to the dough. The extreme end of the pressure plate 45 is formed with an arcuate flange 49 which extends out through the top wall 44 (see Fig. 5) and prevents dough from entering the space between said top wall and the pressure plate.

Driving means is provided for rotating the head and, as shown, said driving means comprises a ring gear 50 bolted or otherwise secured to the underside of the hub 38 and a beveled pinion 51 meshing therewith and mounted on a drive shaft 52 which is journaled in bearing brackets 53 carried by a frame member 54. Power is applied to the drive shaft 52 from any suitable source, here shown as an electric motor 55 mounted in the base of the machine and connected to the drive shaft by a belt 56 and belt pulleys 57, 58. The frame member 54 is provided with a bearing 59 concentric with the axis of the head, and the hub 38 thereof is shown as formed with a hollow shaft 60 which is journaled in said bearing 59. The end thrust of the measuring head and parts connected thereto is taken up by ball bearing members 61 (see Fig. 2), mounted on a frame member 83 of the base.

The means for reciprocating the plunger 31 will now be described. Extending through the hollow shaft 60 is a rock shaft 62 which carries pinions or segmental gears 63, 64 adjacent its ends, that mesh, respectively, with a rack 65 in the plunger 31 and a rack 66 in a slide 67 which is mounted to reciprocate in a slideway formed in a cross-head 68 that is keyed or otherwise rigidly fastened to the hollow shaft 60. The crosshead has an upwardly extending hub 69 which encircles the hollow shaft and is fastened thereto. The crosshead rotates with the head 28 and the slide 67 rotates with the cross-head and reciprocates therein, whereby to oscillate the rock shaft 62 and thereby reciprocate the plunger 31. The means for reciprocating the slide 67, as shown, comprises two rollers 70 which are mounted on the underside of the slide and run against a cam 71 (see Fig. 9) which is normally stationary, but so mounted that it can be adjusted, to time the reciprocating movements of the plunger. The cam 71 has two concentric faces 72, 73 concentric with the axis of the shaft 62 and an eccentric face 74 joining said concentric faces. It will be seen from an inspection of Fig. 9 that as the roller 70 at the left hand side of the figure, travels along the cam face 74, the roller and therewith the slide 67 are moved endwise in the cross-head until they reach the position shown in solid lines in the figure, at which time the roller 70 previously occupying the position at the right hand side of the figure has been moved to the position occupied by the roller 70 at the left hand side. The reciprocating movements of the slide and the rack 66 carried thereby, are transmitted through the pinion 64, rock shaft 62, and pinion 63, to the rack 65 of the plunger and said plunger is thereby reciprocated in the opening 30 in the measuring head and thereby uncovering one pocket therein and ejecting the lump of dough from the other pocket.

The point at which the plunger commences to eject dough from the pocket is governed by the position of the cam 71. The plunger commences to move when one of the rollers 70 reaches the point a (see Fig. 9) on the cam, and the plunger is moved outward in one pocket, and inward in the other during the time that the roller 70 travels along the cam face 74. Consequently, by turning the cam 71 toward the position indicated by the dotted lines at 71, the rollers 70 will encounter the cam face 74 earlier in the cycle of rotation of the cross-head and consequently more dough will be extruded through the escape passages 41, 42 and less dough will be contained in the pocket at the time the plunger commences to eject the dough from the pocket through the discharge opening of the housing. The position of the cam 71, indicated by the dotted lines, in Fig. 9 is an extreme position wherein only a very small amount of dough remains in the pocket to be finally ejected. It will be understood therefore that by moving the cam 71 farther away from the dotted line position, the capacity of the pocket and consequently the size of the lumps of dough measured in the pockets will be increased. During the ejecting movement of the plunger, part of the cylindrical wall indicated at 22a (see Fig. 4) partly closes the outer end of the pocket while it is passing by said part of the wall and prevents the measured amount of dough from being ejected from the pocket until the pocket passes the edge 22b of said wall, which edge defines the edge of the discharge opening 24.

Means are provided for adjusting the position of the cam 71 to regulate the capacity of the pockets, and as shown, said means comprises a worm gear 75 bolted or otherwise secured to the hub 76 of the cam 71 and meshing with a pinion 77 fast on a shaft 78 which is journaled in brackets 79 and has a handwheel 80 upon its outer end.

A short shaft 81 is connected to the lower end of the shaft 60, which short shaft is journaled in a bearing bracket 82 mounted upon the frame member 83. The short shaft 81 is here shown as formed with a flange 84 on its upper end bolted to the underside of the cross-head 68. Through the connection between the cross-head hub 69 and the hollow shaft 60, the shaft extension 81 is rigidly connected to the hollow shaft. The flange 84 provides a support for the slide 67 to rest upon. The ball bearings 61 are interposed between the flange 84 and the hub of the cam and carry the load on the shaft.

A conveyer belt 85 is provided for carrying the measured lumps of dough to another machine for a subsequent operation and said belt is located below the discharge opening 24. The conveyer belt is trained around a pulley 86 mounted on a shaft 87 journaled in bearing brackets 88 and driven from a shaft 89 (see Fig. 2) by a sprocket chain 90 trained over sprocket wheels 91, 92 mounted on the shafts 89, 87. The shaft 89 may be driven from the ring gear 50 by a pinion 92 mounted on the shaft 89.

For convenience in cleaning the blades, the section 36 of the track may be disconnected from the remainder of the track and it is shown as hinged at one end to the base (see Fig. 8) by a hinge 93 and fastened at its other end to the base by a latch 94. A small section 95 of the bed plate is made removable to provide a slot therein through which either knife may be withdrawn from the head when the latter is turned to bring the slot 40 of the hub 38 in line with the slot left when the section 95 is removed.

In the operation of the dough divider the batch of dough is deposited in the hopper 27 and flows into the receiving chamber 29. The projected blade 32, while passing through the receiving chamber, encounters the dough and sweeps some of it into the open pocket 33, and also sweeps some of the dough into the constricted portion of the receiving chamber, which excess portion of the dough is extruded through the escape passages 41, 42 and is returned to the receiving chamber and hopper. The weight 48 for the pressure plate is adjusted to obtain the desired pressure of said pressure plate upon the escaping dough. When the roller 70 of the slide 67 encounters the point, a, on the cam 71, the roller rides outward along the cam face 74 thereby moving the plunger 31 to the opposite end of the opening 30, through the instrumentality of the rack 66, pinion 64, rock shaft 62, pinion 63 and rack 65, and as the pocket commences to pass by the edge 22b of the wall 22a, the plunger commences to eject the measured lump of dough from the pocket, finally discharging it upon the conveyer belt.

During the ejecting action of the plunger, its opposite end recedes into the opposite pocket and the associated blade is projected outward against the cylindrical face of the wall 22, whereby another charge of dough is swept into the then open pocket.

While the divider has been illustrated as having a rotating head lying in a horizontal plane, this is not essential as the head may stand in a vertical plane if desired. In Fig. 14 is suggested an upright arrangement for the head. Two heads may be used and the figure shows two housings 28x for the heads mounted on a base 20x and having a hopper 27x above and between the heads.

I claim as new and desire to secure by Letters Patent:

1. The combination of a housing having walls provided with an inlet opening therebetween for admission of the material and a discharge opening through which the material is discharged, a rotary cylindrical head disposed in said housing to provide a receiving chamber therein, said head having a pocket extending inward from its cylindrical face and adapted to open to said receiving chamber, a blade carried by the head, means for projecting said blade beyond said head whereby to traverse said receiving chamber, said blade co-operating with one wall of the housing to force material into the pocket and means for ejecting the material from the pocket.

2. The combination of a housing having cylindrical walls provided with an inlet opening and a discharge opening therebetween, a cylindrical head eccentrically mounted to rotate in said housing, there being a receiving chamber for the material between the cylindrical walls and the cylindrical face of the head, and there being a pocket in the head opening out through said cylindrical face to said receiving chamber, a blade moving with the head and adapted to be projected beyond the cylindrical face of the head whereby to traverse the receiving chamber, said blade and one cylindrical wall of the housing co-operating to force material into the pocket, and means for ejecting the contents of the pocket.

3. The combination of a housing having walls provided with an inlet opening therebetween for the admission of material and a discharge opening through which the material is discharged, a rotating cylindrical head disposed in said housing mounted to provide a receiving chamber, said head having a pocket therein opening out through the cylindrical face thereof to the receiving chamber, a reciprocating blade carried by the head at the pocket and adapted to traverse the receiving chamber, said blade co-operating with one wall of the housing to force material into the pocket, a plunger in said pocket, and means to reciprocate the plunger.

4. The combination of a housing having cylindrical walls provided with an inlet opening therebetween for the admission of material and a discharge opening through which material is discharged, a rotating cylindrical head in said housing eccentrically disposed with respect thereto to provide a receiving chamber, said head having a radially extending opening therein which opens out at both ends through the cylindrical face of the head, two reciprocating blades, each forming a side of said opening, means for projecting said blades beyond the head to traverse the receiving chamber, said blades and a wall of the housing co-acting to force material into the pockets, a plunger reciprocating in said opening and means for reciprocating the plunger.

5. The combination of a housing having cylindrical walls provided with an inlet opening therebetween for the admission of material and a discharge opening through which the material is discharged, a rotating cylindrical head in said housing mounted eccentrically with respect thereto, to provide a receiving chamber, said head having two oppositely disposed pockets adapted to open to said receiving chamber, two reciprocating blades, each forming a side of a pocket, a track having a part concentric with the cylindrical wall of the housing for projecting said blades beyond the cylindrical face of the head to traverse the receiving chamber, and thereby sweep material into the pocket, a plunger reciprocating in said pockets, and means for actuating the plunger.

6. The combination of a housing having cylindrical walls provided with an inlet opening therebetween and a hopper discharging through said inlet opening, a rotating cylindrical head in said housing eccentrically disposed with respect thereto to provide a receiving chamber, said head having a pocket opening through the cylindrical face thereof to the receiving chamber, a blade forming a side of the pocket and means for projecting the blade beyond the cylindrical face of the head whereby to traverse the receiving chamber, there being an escape passage at one end of the receiving chamber leading to the hopper through which an excess amount of material is extruded by the blade.

7. The combination of a housing having cylindrical walls provided with an inlet opening therebetween and a hopper discharging through said inlet opening, a rotating cylindrical head in said housing eccentrically disposed with respect thereto to provide a receiving chamber, said head having a pocket opening through the cylindrical face thereof to the receiving chamber, a blade forming a side of the pocket and means for projecting the blade beyond the cylindrical face of the head whereby to traverse the receiving chamber, there being an escape passage at one end of said receiving chamber leading to the hopper, through which excess material is extruded, and a pressure plate in said escape passage for retarding the escape of the material.

8. The combination of a housing having cylindrical walls provided with an inlet opening therebetween and a hopper discharging through said inlet opening, a rotating cylindrical head in said housing eccentrically disposed with respect thereto to provide a receiving chamber, said head having a pocket opening through the cylindrical face thereof to the receiving chamber, a blade forming a side of the pocket and means for projecting the blade beyond the cylindrical face of the head whereby to traverse the receiving chamber, there being an escape passage at one end of the receiving chamber leading to the hopper, through which excess material is extruded, a pressure plate in said escape passage for retarding the escape of the excess material, and regulatable pressure applying means.

9. The combination of a housing having cylindrical walls provided with an inlet opening therebetween for the admission of material, a rotating cylindrical head having a pocket therein, said head being eccentrically disposed within said housing, a blade forming one side of said pocket, a cam track having a part concentric with the housing and a part concentric with the head, actuating means for said blade carried thereby and traveling in said cam track, a plunger in said pocket, and means to reciprocate the plunger.

10. The combination of a housing having cylindrical walls provided with an inlet opening therebetween for the admission of material, a rotating cylindrical head having a pocket therein, said head being eccentrically disposed within said housing, a blade forming one side of said pocket, a cam track having a part concentric with the housing and a part concentric with the head, actuating means for said blade carried thereby and traveling in said cam track, a plunger in said pocket, driving means for said head and plunger actuating means driven from said driving means.

11. The combination of a bed plate, a top plate and cylindrical walls therebetween forming a housing, a cylindrical head rotating in said housing on an axis eccentrically disposed with respect to the axis of the cylindrical housing walls, said head having diametrically opposed pockets therein, blades, one for each pocket, for sweeping material into the pockets, a plunger reciprocating in said pockets, driving means for said head, a rock shaft driven from said driving means, and motion transmitting means between said rock shaft and plunger.

12. The combination of a rotating cylindrical head having pockets therein, reciprocating blades, each forming a side wall of a pocket, said blades being adapted to be projected beyond the cylindrical face of the head, a plunger reciprocating in said pockets, a rack carried by said plunger, a segmental gear meshing with said rack, a shaft carrying said segmental gear and means to oscillate said shaft whereby to reciprocate the plunger.

13. The combination of a rotating cylindrical head formed with a pocket extending in from its cylindrical face, a plunger reciprocating in said pocket, driving means for rotating said head, a cross head connected to and rotating with said head, a slide reciprocating in said cross head, means to reciprocate said slide, a shaft, motion transmitting connections between said shaft and plunger and between said slide and shaft for reciprocating the plunger.

14. The combination of a rotating cylindrical head, having a radially extending pocket therein, a plunger reciprocating in said pocket, a reciprocating slide connected to and rotating with said head, motion transmitting connections between said slide and plunger for transferring the reciprocating movements of the slide to the plunger a normally stationary cam, and means carried by the slide traveling along said cam, whereby to reciprocate said slide.

15. The combination of a rotating cylindrical head, having a radially extending pocket therein, a plunger reciprocating in said pocket, a reciprocating slide connected to and rotating with said head, motion transmitting connections between said slide and plunger for transferring the reciprocating movements of the slide to the plunger, a normally stationary cam, having faces concentric with the axis of the head and a cam face connecting said concentric faces, adjustment means to change the position of the cam, and rollers carried by the slide and traveling on said cam whereby to reciprocate the slide.

16. The combination of a cylindrical housing having an inlet opening and a discharge opening, a rotating cylindrical head in the housing eccentrically disposed with respect thereto, and projecting through said discharge opening, said head having a pocket extending in from its cylindrical face, a plunger reciprocating in said pocket and adapted to eject material therefrom through the discharge opening of the housing, means for reciprocating the plunger, an escape passage in said housing for the escape of excess material, a blade carried by the head, operating to sweep material into the pocket and to force excess material into said escape passage, and means to vary the timing of the ejecting strokes of the plunger whereby to vary the size of the contents discharged from the pocket.

17. The combination of a cylindrical housing having an inlet opening and a discharge opening, a rotating cylindrical head in the housing eccentrically disposed with respect thereof, and projecting through said discharge opening, said head having a pocket extending in from its cylindrical face, a plunger reciprocating in said pocket and adapted to eject material therefrom, through the discharge opening of the housing, means for reciprocating the plunger, a pressure regulated escape passage in said housing for the escape of excess material, and means to vary the ejecting strokes of the plunger whereby to vary the size of the contents discharged from the pocket.

18. The combination of a cylindrical housing having a hopper, a receiving chamber, an inlet opening and a discharge opening, and an escape passage leading from the receiving chamber to the hopper, a rotating cylindrical head in the housing eccentrically disposed with respect thereto, and projecting through said discharge opening, said head having a pocket extending in from its cylindrical face, a plunger reciprocating in said pocket and adapted to eject material therefrom, through the discharge opening of the housing, means for reciprocating the plunger, a pressure regulated pressure plate in said escape opening and means to vary the ejecting strokes of the plunger.

19. The combination of a housing having walls providing a receiving chamber, a rotating cylindrical head forming one wall of said housing chamber, said head having a pocket, opening through the cylindrical face thereof to the receiving chamber, a blade contained in the head adjacent the pocket, and means for projecting the blade beyond the cylindrical face of the head whereby to traverse the receiving chamber, there being an escape passage at one end of the receiving chamber through which the blade extrudes excess material.

20. The combination of a housing having walls providing a receiving chamber, a rotating cylindrical head, forming one wall of said receiving chamber, said head having a pocket, opening through the cylindrical face thereof to the receiving chamber, a blade contained in the head adjacent the pocket, means for projecting the blade beyond the cylindrical face of the head whereby to traverse the receiving chamber and sweep material into the pocket, said blade cooperating with one wall of the housing to force material into the pocket and to extrude excess material therefrom.

FRED MARASSO.